(No Model.)
J. W. SIMPSON.
MACHINE FOR GRINDING SCISSORS OR SHEARS.
No. 436,156. Patented Sept. 9, 1890.
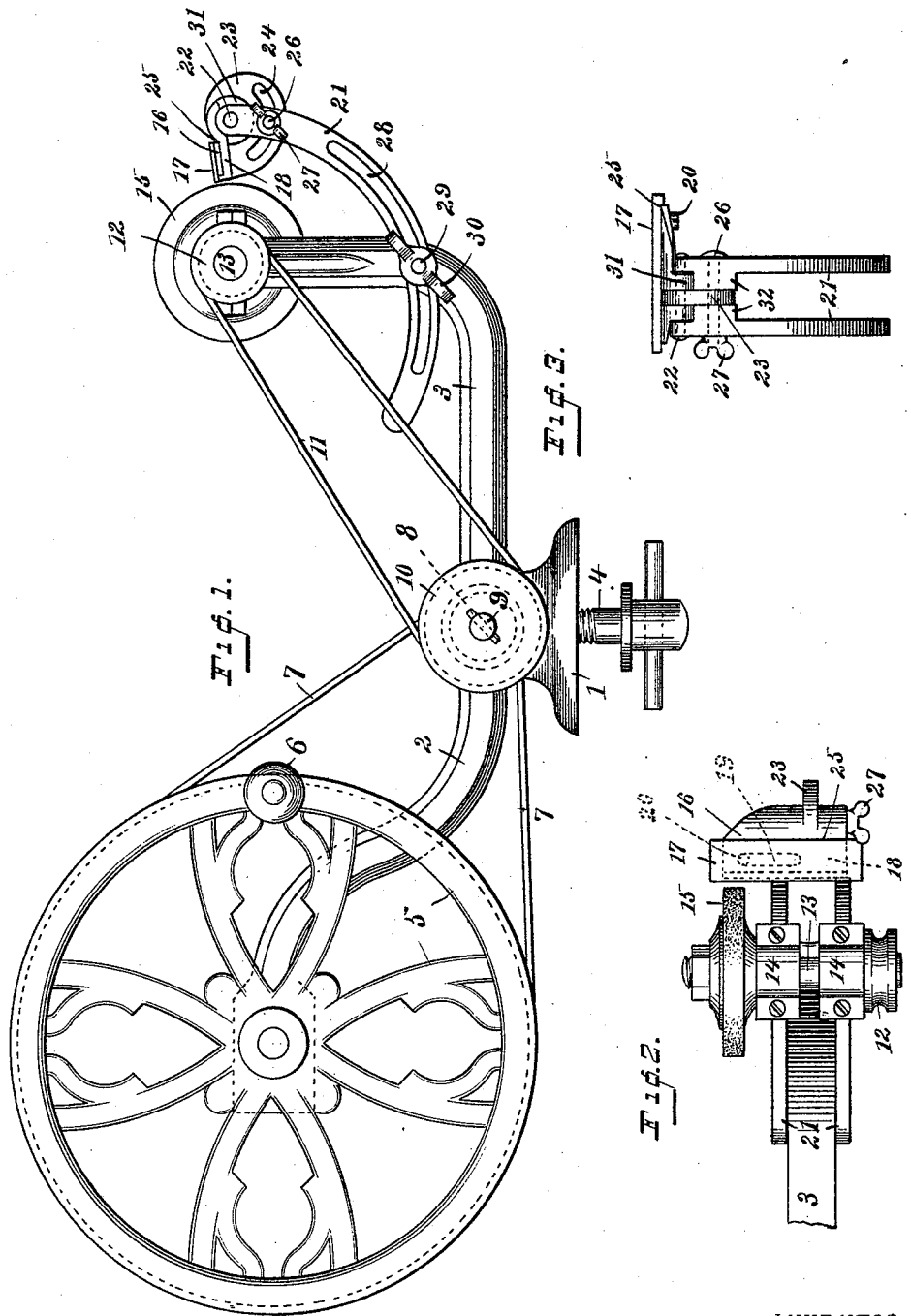
WITNESSES
C. M. Newman,
Azley I. Munson.
INVENTOR
John W. Simpson
By F. W. Wooster
Atty.

UNITED STATES PATENT OFFICE.

JOHN W. SIMPSON, OF THOMASTON, CONNECTICUT.

MACHINE FOR GRINDING SCISSORS OR SHEARS.

SPECIFICATION forming part of Letters Patent No. 436,156, dated September 9, 1890.

Application filed June 5, 1890. Serial No. 354,362. (No model.)

*To all whom it may concern:*

Be it known that I, JOHN W. SIMPSON, a citizen of the United States, residing at Thomaston, in the county of Litchfield and State of Connecticut, have invented certain new and useful Improvements in Machines for Grinding Scissors and Shears; and I do hereby declare the following to be a full, clear, and exact description of the invention, such as will enable others skilled in the art to which it appertains to make and use the same.

My invention has for its object to provide a machine of this class having all the adjustments that can be required in use and which shall be so simple in construction and inexpensive to produce as to place it within the reach of all small shops and even private families. It is of course well known that in tailors' and other shops, more especially in barbers' shops, the grinding of shears forms quite an important item of expense. Shears used in hair-cutting require to be sharpened frequently, and the aggregate amount paid for the sharpening of shears during each year makes an important showing in the expense account. An additional inconvenience results from the fact that in many small towns there is no place where this kind of work is done, necessitating that the shears be sent out of town, which takes several days, adds to the expense, and compels barbers to keep a large number of pairs continually in use.

My present invention provides a simple and compact machine, requiring but little room, which is easily adjusted and is practically impossible to get out of repair, the work of grinding, in fact, being so easily and quickly done that the machine soon pays for itself.

In the accompanying drawings, forming part of this specification, Figure 1 is a side elevation of my novel machine complete; Fig. 2, a plan view of the grinding-wheel, blade-rest, holder, and carrying-arms in operative position; and Fig. 3 is an end view of the rest, holder, and carrying-arms detached.

1 denotes the base, and 2 and 3 arms extending in opposite directions therefrom, the arms and the base being in practice made in a single casting. The base is preferably locked firmly in position upon a suitable rest (not shown) by means of a locking-screw 4, or in any convenient manner. At the outer end of arm 2 is journaled a driving-wheel 5, which also preferably serves as a balance-wheel, a handle 6 being attached to the side of the rim of the wheel to serve as a crank. This wheel is provided with a groove in its periphery, and a belt 7 extends therefrom to a pulley 8 on a shaft 9, the pulley being shown in dotted lines only. The shaft is journaled in the top of the base, as indicated in Fig. 1.

10 denotes another pulley on shaft 8, from which a belt 11 extends to a pulley 12 on a shaft 13, mounted in bearings 14 at the outer end of arm 3, as is clearly shown in Fig. 1. At the opposite end of shaft 13 is secured a grinding-wheel 15, any suitable emery or corundum wheel being used upon the machine. It will of course be understood that the shape of the base and arms and the manner in which motion is communicated to the grinding-shaft may be varied greatly without departing from the principle of my invention.

I have shown one simple and inexpensive way in which I have organized the machine and which I have found thoroughly practical in use. In order that a blade while being ground may be conveniently supported and at any required angle, I provide a rest therefor, which is denoted by 16, this rest being a metallic plate, preferably having cemented thereto a piece of leather 17, upon which the under side of the blade rests. This rest is supported by a suitable holder 18 and may, if preferred, be stationary, although in practice I ordinarily provide ways 25 in the holder for the rest to slide in, (see Fig. 1,) the holder being provided with a slot 19, (see dotted lines, Fig. 2,) through which a locking-screw 20 passes from below and engages the under side of the rest. The rest is thus held firmly in operative position, but is allowed to reciprocate laterally relatively to the grinding-wheel. The holder is pivoted between two carrying-arms 21, the pivot being indicated by 22. Upon the under side of the holder is a plate 23, which lies between the carrying-arms, and is itself provided with a curved slot 24. A bolt 26, having a thumb-nut 27, passes through the carrying-arms and through the slot in plate 23. Each of the carrying-arms is provided with a curved slot 28, said carrying-arms preferably lying on opposite sides of arm 3.

29 denotes a bolt which passes through arm 3 and through the slots in the carrying-arms. A thumb-nut 30 engages the end of the bolt to lock the carrying-arms at any required adjustment, as is clearly shown in Fig. 1. It will thus be seen that by means of the curved slots in the carrying-arms and plate 23 and the bolts and thumb-screws acting in connection with said slots I am enabled to adjust the height of the rest relatively to the grinding-wheel, the distance of the rest from the grinding-wheel, and also the angle of the rest relatively to the grinding-wheel. The height of the rest and its distance from the grinding-wheel may be adjusted by simply loosening thumb-nut 30 and moving the carrying-arms upward or downward or swinging their upper ends inward or outward, as may be required. Having secured the desired adjustment, the parts are locked in position by tightening up the thumb-screw. It will of course be apparent that in grinding the under edge of the shear-blade is laid flat upon the rest and the blade is moved backward or forward across the face of the grinding-wheel. Should it be desired at any time to change the angle at which the blade is ground, it may be done by simply loosening thumb-screw 27 and swinging the holder upward or downward, as may be required, on its pivot. Having secured the desired adjustment, the holder is locked in position again by tightening up the thumb-nut. I preferably pivot the holder to the carrying-arms in the manner illustrated in Fig. 3, pivot 22 passing through ears 31 on the under side of the holder and the carrying-arms being provided with lugs 32 on their inner sides, which are clamped against plate 23 when thumb-nut 27 is tightened up.

Having thus described my invention, I claim—

1. The combination, with an arm 3, carrying a grinding-wheel, of a rest, a holder therefor having a curved slot 24, carrying-arms having curved slots 28, and bolts and thumb-nuts, substantially as described, whereby the holder may be adjustably secured to the carrying-arms and the carrying-arms may be adjustably secured to arm 3.

2. The combination, with arm 3 and the grinding-wheel carried thereby, of a longitudinally-sliding rest and an adjustable holder having ways in which the rest slides.

3. The base, arms 2 and 3, shaft 9, journaled in the base and having belt-pulleys, and shaft 16, carrying a grinding-wheel, in combination with belts 7 and 11 and an adjustable rest for supporting the blade to be ground.

4. The combination, with the adjustable carrying-arms and an adjustable holder pivoted thereto and having a slot 19 and ways 25, of a sliding rest engaging said ways, and a bolt passing through said slot and engaging the rest, as and for the purpose set forth.

In testimony whereof I affix my signature in presence of two witnesses.

JOHN W. SIMPSON.

Witnesses:
HENRY F. BRUNS,
HENRY E. STOUGHTON.